United States Patent [19]

Keglewitsch

[11] 4,417,373

[45] Nov. 29, 1983

[54] CHANNEL CLAMP

[75] Inventor: Josef Keglewitsch, Bowling Green, Ohio

[73] Assignee: Marathon Electric Manufacturing Corporation, Wausau, Wis.

[21] Appl. No.: 314,852

[22] Filed: Oct. 26, 1981

[51] Int. Cl.[3] .......................... A44B 21/00; F16D 1/00

[52] U.S. Cl. ...................................... 24/458; 403/104; 403/363; 248/224.2; 24/459

[58] Field of Search ........... 24/243 B, 248 SA, 135 R, 24/136 B, 263 A, 243 R, 243 K; 411/84, 85; 248/225.3 A, 226.5, 316 C, 224.2, 500, 73, 27; 339/198 GA; 361/359, 417, 419, 420, 427; 403/104, 363

[56] References Cited

U.S. PATENT DOCUMENTS

| | | | |
|---|---|---|---|
| 1,459,582 | 6/1923 | Dubee | 24/243 B |
| 2,084,926 | 6/1937 | Tinnerman | 24/243 B |
| 2,766,502 | 10/1956 | Ranson | 24/248 SA |
| 2,964,927 | 12/1960 | Patterson | 24/263 A |

FOREIGN PATENT DOCUMENTS

| | | | |
|---|---|---|---|
| 2309397 | 10/1973 | Fed. Rep. of Germany | 339/198 GA |
| 366575 | 2/1963 | Switzerland | 339/198 GA |

*Primary Examiner*—Robert Peshock
*Assistant Examiner*—John Weiss
*Attorney, Agent, or Firm*—Andrus, Sceales, Starke & Sawall

[57] ABSTRACT

A readily assembled and detachable clamp for securing an electrical connector to a base. The clamp has a lower leg which extends horizontally and terminates in a reverse bend extending into an upper leg which from the reverse bend tapers upwardly over the lower leg to a flat portion lying over the lower leg. This portion terminates at the outer end in an upright leg which acts as a stop for the head of a screw which is threaded through a threaded hole in the flat portion of the upper leg and into engagement with the lower leg to clamp the latter to the base as well as to the electrical connector and also the upright leg provides a handle to insert and remove the clamp and align it properly in place.

6 Claims, 7 Drawing Figures

FIG.3
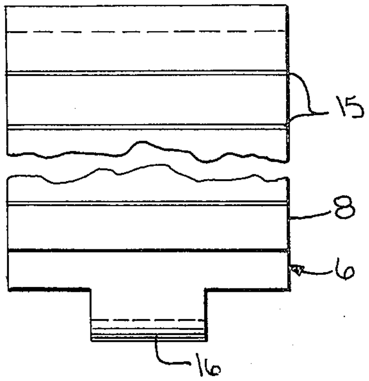
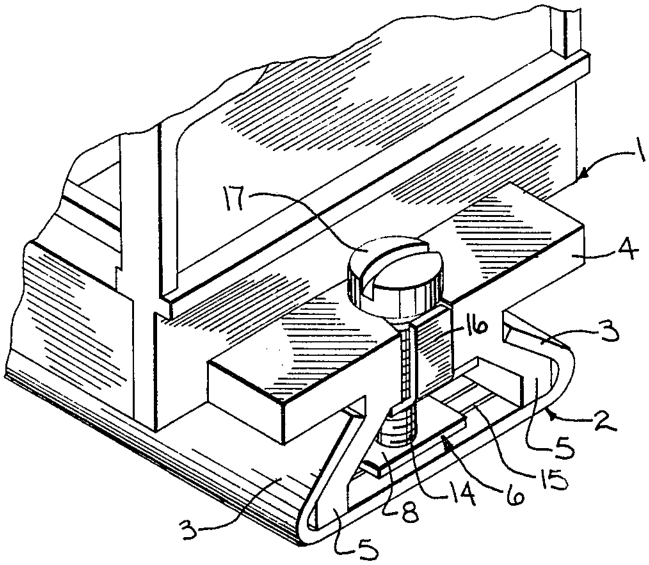
FIG.1
FIG.2
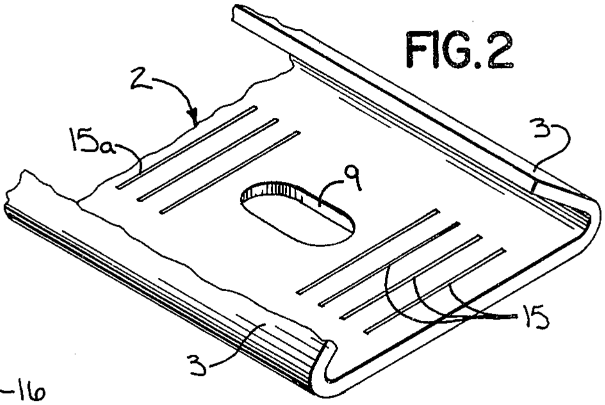
FIG.4
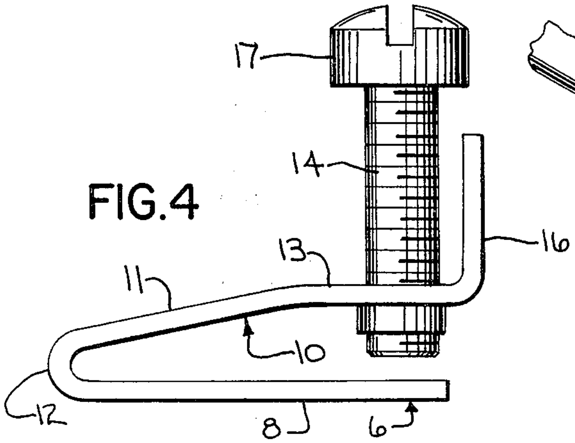
FIG.6
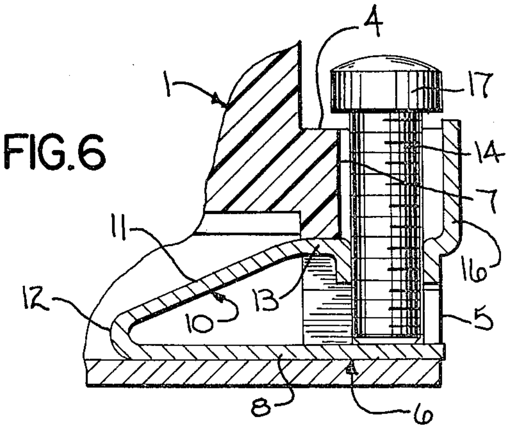
FIG.5
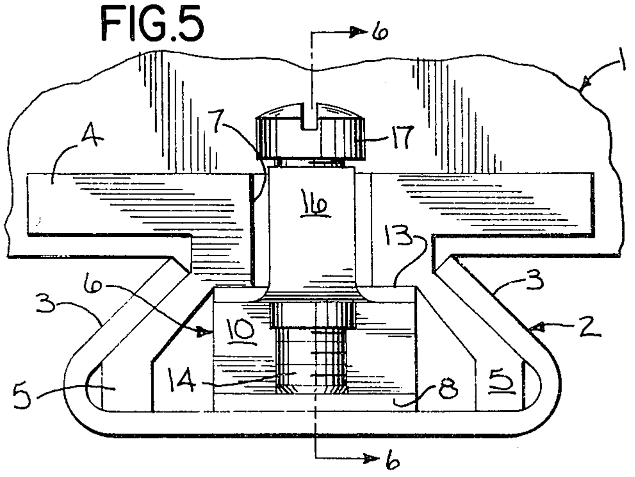
FIG.3A
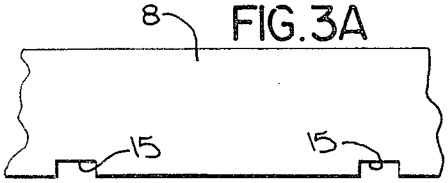

CHANNEL CLAMP

SUMMARY OF THE INVENTION

The invention provides a readily assembled and detachable clamp for securing an electrical connector to a base or channel. The clamp has a lower leg and an upper leg which overlies the lower leg. The lower leg extends in a horizontal direction and terminates in a reverse bend which joins it at one end to the upper leg. The upper leg extends on a taper upwardly from the reverse bend and the tapered portion terminates in a straight portion which overlies the lower leg. The straight portion terminates at the outer end in an upright leg which provides a handle to manipulate the clamp into position beneath the foot of the connector and to easily remove the clamp. The straight portion has a threaded opening through which a screw is threaded and the screw passes downwardly through a generally central slot at the forward end of the foot of the connector and is lodged in engagement with the lower leg. This results in clamping the lower leg to the channel and the upper leg of the clamp to the foot of the clamp. The head of the screw has a downward predetermined movement and it engages the top of the upright leg to limit its movement and prevent over deflection of the respective legs of the clamp.

BRIEF DESCRIPTION OF THE DRAWINGS

FIG. 1 is a perspective view of the clamp of the invention applied to a connector;

FIG. 2 is a perspective view showing a portion of the channel of the connector and illustrating mounting holes and ridges;

FIG. 3 is a top view of the bottom surface of the lower leg of the clamp;

FIG. 3*a* is a detailed view of the channel of the connector illustrating the plurality of depressions therein;

FIG. 4 is a side elevational view of the clamp of the invention with the screw partially threaded through the upper leg;

FIG. 5 is an end view of the clamp illustrating the screw threaded against the lower leg; and FIG. 6 is a cross section of the clamp and connector taken on line 6—6 of FIG. 5.

DESCRIPTION OF THE INVENTION

Referring to the drawings, there is illustrated an electrical connector 1 secured to a base which normally is a channel 2 with inturned flanges 3. The connector 1 has a foot 4 at the end which has angular downward side extensions 5 which are lodged within the inturned flanges 3 of channel 2 and the sides 3 of channel 2 thus aid in securing the connector 1 to channel 2. The foot 4 is also engaged by the clamp 6 of the invention to clamp the connector 1 to channel 2 and has a central slot 7 which aids in properly aligning clamp 6 when it is inserted into engagement with foot 4. Clamp 6 has two legs consisting of a lower leg 8 which in clamping position overlies the flat or body portion of channel 2 as shown in FIGS. 5 and 6. Channel 2 has mounting holes 9 and the lower leg 8 of clamp 6, being flat, bridges holes 9. Clamp 6 also includes an upper leg 10 located at the bottom surface of foot 4. Lower leg 8 extends horizontally and terminates at the rear in a reverse bend 12 which joins lower leg 8 to upper leg 10 and overlies lower leg 8. Upper leg 10 extends on a taper 11 upwardly from reverse bend 12 which joins legs 8 and 10 to a flat portion 13 overlying lower leg 8. Taper 11 provides for easy insertion and removal of clamp 6 with respect to its clamping position about foot 4. Flat portion 13 has a threaded hole through which is threaded the screw 14 and screw 14 extends through slot 7 and into engagement with lower leg 8 to clamp leg 8 to channel 2 and at the same time the upper leg 10 is drawn into engagement with foot 4 as illustrated in FIG. 6. The lower leg 8 on the bottom may have ridges or serrations 15 provided in the bottom surface of the body of leg 8 to hold the leg 8 against slippage when in clamping position. Likewise the upper surface of the base or channel is provided with serrations or ridges 15 or the like to aid in preventing slippage of the clamp. The upper leg 10 terminates in an upstanding end or leg 16 which is engaged by the head 17 of screw 14 as the screw is threaded downwardly. The engagement of head 17 with leg 14 thereby limits the downward extent of screw 14 so that the lower leg 8 and upper leg 10 are prevented from over deflection. Leg 10 thus acts as a positive stop. Upright leg 16 also aids in aligning the clamp 6 to properly connect it with foot 4 and provides a handle to be readily gripped for insertion or removal of clamp 6.

Clamp 6 is aligned by upright leg 16 through the slot opening 7 in foot 4 and leg 8 is pushed by leg 16 beneath and over foot 4 to lodge the lower leg 8 on channel 2 and upper leg 10 is pushed over foot 4. The taper 12 in upper leg 10 aids in pushing the clamp 6 into clamping position. Screw 14 is then threaded through the threaded hole in the upper leg 10 of the clamp and through opening 7 and into engagement with lower leg 8. This tends to pull the upper leg 10 against the bottom of foot 4 and forces the lower leg 8 into secure engagement with the channel 2. Over deflection of the channel legs by screw 14 is prevented when the head 17 of screw 14 engages upright leg 16.

The clamp of the invention provides positive locking for electrical connectors and does not protrude out of the end of the base to which the connector is secured. Because of the tapered construction of the upper leg, the clamp can be easily inserted in place and removed. The clamp resists removal because of the tendency of the clamp to take a "V" shape and because depressions or ridges or other non-slip means on the base of connector 1 tend to prevent slippage of clamp 6. The thread form in place of a tapped hole as well as the basic shape results in low cost tooling in making the clamp.

The upright end or leg aligns the clamp with the foot of the connector and provides a handle for easy insertion and removal of the clamp. Clamp 6 also utilizes available longitudinal space to place its working/flexing member in an unoccupied space of connector 1. An unoccupied space at the end of the connector permits easy assembly of an adjacent connector.

Various modes of carrying out the invention are contemplated as being within the scope of the following claims particularly pointing out and distinctly claiming the subject matter which is regarded as the invention.

I claim:

1. An U-shaped clamp having overlapping members defining a clamping opening for securing an electrical connector support member to a base member, which comprises a lower leg extending over the base member when the clamp is applied thereto and terminating at the inner end in a reverse bend which joins the lower leg to an upper leg which overlies the lower leg, said upper leg being located in opposed relation to the support member, and the upper leg extends on a taper from the reverse bend to a flat portion extending over the lower leg, a threaded hole provided in the flat portion, and threaded means provided to extend through said threaded hole and into engagement with the lower leg and operable to move the upper leg into clamping engagement with the support member to secure the clamp and connector to the base member.

2. The clamp of claim 1 and the upper leg terminating at the outer end in an upright leg, and the threaded means having a head thereon which extends laterally over the end of the upright leg and when the threaded means is threaded through the hole in the upper leg in a predetermined downward movement the head on the threaded means engaging the upright leg to thereby prevent over deflection of the legs by said threaded means.

3. The clamp of claim 1 wherein said taper of the upper leg of the clamp effecting easy assembly and removal of the clamp from support and base member, said support having a generally central slot on the outer end, and said threaded means being a screw extending through the upper leg and through the slot in the support and against the lower leg to clamp the lower leg to the base member and draw the upper leg securely into engagement with the lower surface of the support to thereby securely clamp the connector support to the base member.

4. The clamp of claim 1 and the lower leg of the clamp having a non-slip means for engaging the base member upon which the connector support is assembled to thereby prevent slipping of the clamp on the base member.

5. The clamp of claim 1 being so constructed as to occupy minimal space outside of the connector support, thereby permitting subsequent connector assembly without loss of space.

6. The clamp of claim 1 wherein longitudinally spaced depressions are provided in the lower leg of the clamp adapted to receive a plurality of longitudinally spaced ridges in the base member to thereby prevent slippage of the clamp within the connector.

* * * * *

UNITED STATES PATENT AND TRADEMARK OFFICE
CERTIFICATE OF CORRECTION

PATENT NO. : 4,417,373

DATED : November 29, 1983

INVENTOR(S) : JOSEF KEGLEWITSCH

It is certified that error appears in the above-identified patent and that said Letters Patent are hereby corrected as shown below:

Col. 3, Line 21, CLAIM 3 After "support" insert ---member---;
Col. 3, Line 22, CLAIM 3 After "support" insert ---member---;
Col. 4, Line 3, CLAIM 3 After "port" insert ---member---;
Col. 4, Line 6, CLAIM 3 After "support" insert ---member---
Col. 4, Line 10, CLAIM 4 After "support insert ---member---;
Col. 4, Line 15, CLAIM 5 After "support" insert ---member---.

Signed and Sealed this

*Fourteenth* Day of *August 1984*

[SEAL]

*Attest:*

GERALD J. MOSSINGHOFF

*Attesting Officer* *Commissioner of Patents and Trademarks*